(12) United States Patent
Bergström et al.

(10) Patent No.: US 10,046,765 B2
(45) Date of Patent: Aug. 14, 2018

(54) METHOD TO CONTROL AN ENGINE BRAKING OPERATION

(71) Applicant: VOLVO TRUCK CORPORATION, Göteborg (SE)

(72) Inventors: Klas Bergström, Västra Frölunda (SE); Lars Karlsson, Göteborg (SE); Johan Bjernetun, Göteborg (SE); Lennart Brusved, Billdal (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/037,093

(22) PCT Filed: Nov. 19, 2013

(86) PCT No.: PCT/EP2013/003487
§ 371 (c)(1),
(2) Date: May 17, 2016

(87) PCT Pub. No.: WO2015/074671
PCT Pub. Date: May 28, 2015

(65) Prior Publication Data
US 2016/0297446 A1    Oct. 13, 2016

(51) Int. Cl.
*B60W 30/18* (2012.01)
*B60W 10/113* (2012.01)
(Continued)

(52) U.S. Cl.
CPC ...... *B60W 30/18136* (2013.01); *B60W 10/06* (2013.01); *B60W 10/113* (2013.01);
(Continued)

(58) Field of Classification Search
None
See application file for complete search history.

(56) References Cited

U.S. PATENT DOCUMENTS

2006/0150759 A1    7/2006    Gitt
2007/0167282 A1    7/2007    Rinderknecht
(Continued)

FOREIGN PATENT DOCUMENTS

JP    2004125050 A    4/2004
JP    20071000878 A    4/2007

OTHER PUBLICATIONS

International Search Report dated Jul. 16, 2014 for corresponding International App. PCT/EP2013/003487.

*Primary Examiner* — Erin D Bishop
*Assistant Examiner* — Lori Wu
(74) *Attorney, Agent, or Firm* — WRB-IP LLP

(57) ABSTRACT

A method is provided to control an engine braking operation of a vehicle provided with a dual clutch transmission. The dual clutch transmission is adapted to be set into different gear-combinations, each including an active gear selection through which torque can be transmitted, and a passive gear selection through which no torque can be transmitted. In a pre-set number of gear-combinations, the first input shaft and the main shaft have a synchronised rotation. When an engine braking operation is performed when the transmission is set in one of the pre-set number of gear-combinations modifying said engine braking operation such that a damaging load upon said spigot bearing is reduced.

12 Claims, 3 Drawing Sheets

(51) Int. Cl.

| | |
|---|---|
| *B60W 30/184* | (2012.01) |
| *F16H 59/70* | (2006.01) |
| *F16H 61/02* | (2006.01) |
| *F16H 61/21* | (2006.01) |
| *F16H 61/688* | (2006.01) |
| *B60W 10/06* | (2006.01) |
| *F16H 59/18* | (2006.01) |

(52) U.S. Cl.
CPC ........... *B60W 30/184* (2013.01); *F16H 59/70* (2013.01); *F16H 61/0213* (2013.01); *F16H 61/21* (2013.01); *F16H 61/688* (2013.01); *B60W 2510/069* (2013.01); *B60W 2510/1005* (2013.01); *B60W 2710/0666* (2013.01); *B60W 2710/1005* (2013.01); *B60Y 2300/184* (2013.01); *F16H 2059/186* (2013.01)

(56) References Cited

U.S. PATENT DOCUMENTS

| | | | |
|---|---|---|---|
| 2011/0004383 A1 | 1/2011 | Seufert et al. | |
| 2013/0005525 A1* | 1/2013 | Hedman | ................. F16H 3/006 |
| | | | 475/218 |
| 2013/0133450 A1 | 5/2013 | Hedman et al. | |
| 2014/0046555 A1* | 2/2014 | Slapak | ................... B60K 17/28 |
| | | | 701/53 |

* cited by examiner

METHOD TO CONTROL AN ENGINE BRAKING OPERATION

BACKGROUND AND SUMMARY

The present invention relates to the field of vehicle transmissions and especially dual clutch transmission. The invention comprises a method to control a dual clutch transmission during an engine braking operation of a vehicle in order to limit the wear of a tapered roller bearing within the dual clutch transmission.

Dual clutch transmission (DCT) can be used both for automatic transmission and manual transmission applications. Except for improved driveability, one of the advantages with DCT is that there is, if used properly, no interruption in the torque delivery during gear shifting due to that the transmission facilitates the use of an active and a passive gear. Meanwhile driving on the active gear, the passive gear is prepared for instant engagement. The passive gear is preferably the gear that, depending on prevailing driving conditions, it is most suitable to shift to.

In a transmission with helical gears the bearings are exposed to radial and axial loads. The gears are normally provided with tapered roller bearings, which during a relative rotation within the bearing, are designed to handle both radial and axial loads.

In a dual clutch transmission the main shaft is commonly suspended in one of the input shafts through a tapered roller bearing called a spigot bearing. Spigot bearings are commonly used in automotive driveline application since they are configured to handle both large axial loads and large radial loads.

The magnitude of the loads the spigot bearing is exposed to is primarily dependent on the torque transferred by the transmission and which gear that is engaged. At some gears and at some gear speeds the spigot bearing is subjected to very large axial forces. The axial forces originate from the use of helical gears, which when transferring torque generate an axial gear mesh force.

In normal operation an oil film is present between the rollers and the raceways of a roller bearing. The continuous maintaining of the oil film is facilitated in bearings by the relative rotation of the rollers and the inner and outer ring of the bearing. If there is no relative rotation between the inner and outer ring of the spigot bearing, the oil will be locally squeezed out gradually by the loads upon the beating. Consequently, large axial forces upon the spigot bearing are especially problematic at gear speeds when there is no relative rotation between the inner and outer ring of the spigot bearing. This unfavourable operating condition, with no relative rotation between the inner and outer ring of the spigot bearing occurs during engine braking when the axial load can be very large. The transmission is normally designed such that the axial forces from the helical gears equal each other out or at least do not subject the spigot bearing to axial loads. When there is no relative rotation between the inner and outer ring of the spigot bearing fretting wear may occur. The fretting wear occurs due to small movements between the rollers and raceways. The repeated grinding between the two surfaces over a period of time will remove material from one or both surfaces in contact. This lead to wear of the raceways and rollers and consequently to premature damage of the bearing. Damaged bearings may cause severe damage to the transmission, and in the end failure of the drivetrain. Also, due to the location of the spigot bearing, generally being arranged within the gear box, and preferably within a shaft, the replacement of the spigot bearing may be very laborious and therefore costly.

The object of the present invention is to provide an inventive method to control a dual clutch transmission during an engine braking operation, thus increase the bearing lifetime by avoiding wear of a spigot bearing arranged between a first input shaft and a main shaft, with minimum impact on driveability and design.

The inventive method decreases or prevents damaging load upon a spigot bearing during engine braking situations where there is no relative rotation in the spigot heating. The spigot bearing is arranged between a first input shaft and a main shaft of the transmission. The method is based upon the idea that when a situation occurs, which results in damaging loads upon the spigot bearing, the state of the transmission is changed.

The inventive method can be used for both automatic and manual transmissions. For automatic transmissions the inventive method can be implemented in the automatic transmission control. For manual transmissions the inventive method may be implemented by providing a warning indication functionality in order to inform a driver of that the state of the transmission should be changed.

The inventive method is intended to control an engine braking operation of a vehicle provided with a dual clutch transmission. The dual clutch transmission comprises a main shaft and a first and a second coaxial input shaft, wherein the first input shaft is arranged inside the second input shaft. The input shafts can be connected to a vehicle engine via a first and a second driving clutch, wherein the first input shaft can be connected to the first driving clutch and the second input shaft can be connected to the second driving clutch. When the first driving clutch is engaged the power from the vehicle engine is transferred to the first input shaft, whereas the second driving clutch is disengaged and no power is transferred to the second input shaft. Consequently, when the second driving clutch is engaged the power from the vehicle engine is transferred to the second input shaft, whereas the first driving clutch is disengaged and no power is transferred to the second input shaft. The first and second input shafts may be provided with toothed gearwheels. A set of gears are allocated to each of the input shafts, e.g. the odd gears are allocated to the first input shaft and the even gears are allocated to the second input shaft.

The main shaft is suspended in the first input shaft through the spigot bearing and the first input shaft is rotationally connected to a first toothed gearwheel, which is rotatably arranged upon the main shaft. The first gearwheel of the main shaft meshes with a gearwheel of a first or second counter shaft. Additionally, the main shaft can be provided with an engaging sleeve for locking of a rotation of the first gearwheel to a synchronized rotation of the main shaft.

The dual clutch transmission is adapted to be set into different gear-combinations, each comprising an active gear selection and a passive gear selection. For a specific gear-combination, both the first and the second input shafts are engaged such that if respective first or second driving clutch is engaged torque can be transferred by any of the two input shafts. However, during normal driving (i.e. not during gear shifting) only one of the first and the second driving clutches is engaged, wherein the torque transmitting gear of the engaged input shaft is the active gear selection and that gear is defined as the active gear. Consequently, when the first driving clutch is engaged, power from the vehicle engine is transferred to the first input shaft and consequently one of the gears allocated to the first input shaft is active. Thus, the second driving clutch is disengaged, and no power from the vehicle engine is transferred to the second input shaft. However, one of the gears allocated to the second input shaft is prepared such that torque can be transmitted instantly when the second driving clutch is engaged. The prepared gear allocated to the second input shaft is defined as the passive gear.

The different gear-combinations are generated by combining and rotatably locking the gearwheels of the first and second input shafts, the first and second countershafts and of the main shaft, in a known manner.

The passive gear is prepared for instant engagement without interrupting the torque transfer. Which gear that is selected as the passive gear is controlled by a control system in the vehicle, which can be configured in various ways.

Which gear that is selected as the passive gear is generally dependent on prevailing driving conditions, with the restriction that the passive gear cannot be a gear allocated to the same input shaft as current active gear.

In a pre-set number of gear-combinations, the first input shaft and the main shaft have a synchronised rotation, meaning that there is no relative rotation between an inner and an outer ring of the spigot bearing. According to the inventive method, when the vehicle is set in an engine braking operation it is continuously checked if the transmission is set in one of the pre-set number of gear combinations.

According to the inventive method; if the transmission is set in one of the pre-set number of gear combinations the engine braking operation is modified such that a damaging load upon the spigot bearing is reduced.

By modifying the engine braking operation such that the damaging load upon the spigot bearing is reduced a relative rotation within the spigot bearing and/or a reduction or a removal of the damaging load is introduced. By removing the transmission from its state with damaging load on the spigot bearing with no relative rotation, wear on the spigot bearing can be prevented. Consequently, the inventive method will prevent fretting wear of the spigot bearing without making any changes of current hard ware design.

In a development of the inventive method, the reduction of damaging load upon the spigot bearing is achieved in that an engine braking torque is reduced. Reducing the engine braking torque has the advantage of decreasing the axial load upon the spigot bearing is reduced and thereby lesser damaging. This has the advantage of optimizing the engine braking operation with a minimal wear of the spigot bearing. Reducing the braking torque may e.g. be accomplished by controlling braking operations such as exhaust brake control or compression engine brake control.

In a further development of the inventive method, the modifying of the engine braking operation comprises an interruption of the engine braking operation. An interruption reduces the axial loads upon the spigot bearing completely, whereby any unnecessary fretting and wear upon the spigot bearing can be avoided.

In a further development of the inventive method, the modifying of the engine braking operation at least comprises an interruption of the engine braking operation in one of the preset number of gear combinations. By interrupting the engine braking operation in one of the pre-set gear combinations, the damaging loads upon the spigot bearing is completely removed. This is achieved either by an actual interruption of the engine braking operation or more preferably that the transmission performs a gear change such that the engine braking operation can continue in a gear which does not belong the pre-set number of gear combinations.

The modifying of said engine braking operation preferably comprises selecting a gear-combination, which gear-combination comprises an active gear reducing an axial load (F) upon the spigot bearing. Selecting a higher gear as active gear provides lower axial load (F).

Selecting a gear which provides less axial load (F) will increase the time before the oil film of the spigot bearing is squeezed out, hence prolong the time before fretting wear may occur.

In yet a further development of the inventive method, the modifying comprises that a gear-combination is selected which comprises a passive gear which allows a relative rotation between the first input shaft and the main shaft. By selecting a passive gear which allows a relative rotation between the first input shaft and the main shaft, the preferred active gear may be used without having to consider the risk of damaging the spigot bearing due to fretting wear. i.e. the selected passive gear and the active gear-combination is not part of the pre-set number of gear-combinations for which the first input shaft and the main shaft have a synchronised rotation.

In a further development of the inventive method said modifying comprises that a gear-combination is selected which does not comprise a passive gear, which allows relative rotation between the first input shaft and the main shaft.

In another development of the inventive method, the modifying comprises that a gear-combination is selected which comprises an active gear, which allows a relative rotation between the first input shaft and the main shaft.

One aspect of the invention suggest that a timer starts if it is determined that the transmission is set in one of the pre-set number of gear combinations, whereby first when the timer has reached a predefined time limit a modifying of the engine braking operation is performed.

The inventive method comprises a plurality of measures in order to modify the engine braking operation in order to reduce the damaging axial load upon the spigot bearing. The plurality of measures can be executed simultaneously or in sequence. When using a timer, different measures can be set to start at different times in order to optimise the modifying of the engine braking operation.

According to one development of the inventive method, the predefined time limit may be set to 0. Setting the predefined time limit to zero initiates gear shifting instantly if the engine braking operation is performed in one of the pre-set number of gear-combinations.

If the predefined time limit is set to 0 for the development of the inventive method which reduces axial load, if selected gear-combination is part of the pre-set number of gear-combinations for which the first input shaft and the main shaft have a synchronised rotation, the defined measure which sets the transmission in a state that interrupts the engine braking operation in the present of the pre-set number of gear-combinations is performed immediately. This development of the inventive method has the advantage of that if the time limit is set to zero, a gear-combination which sets the transmission in a more favourable state is selected instantly instead of a gear-combination from the pre-set number of gear-combinations. This will minimize the fretting wear.

In yet another development of the inventive method, the predefined time limit is dependent on at least one of the following parameters; axial load, bearing wear, time since last oil change, oil temperature in the transmission. In the pre-set number of gear-combinations the first input shaft and the main shaft have a synchronised rotation, meaning that there is no relative rotation between an inner and an outer ring of the spigot bearing, the time before harmful fretting wear occurs is strongly dependent on the properties of the oil film and involved hard ware. As long as the oil film is present, the raceway surfaces of the spigot bearing will not be subjected to fretting wear, but when the oil film is squeezed out due to the local pressure and the repeated movement of the rollers against the raceway damaging wear will occur. Current wear of the spigot bearing, the condition of the raceways of the spigot bearing, applied axial load (F) and the properties of the oil, which is dependent on parameters such as time since last oil change, oil quality, temperature of the oil, all have impact on the time before the protective oil film is terminated, hence also on the acceptable time limit. By considering and optimizing the time limit dependent upon the parameters affecting the time limit (t), the advantage is that the time limit may be maximized without risking wear of the spigot bearing.

In one development of the inventive method, the time limit is predefined to be between 0 and 120 seconds.

The method can be run on a computer program. The computer program comprising code means for performing the steps of the method when said program is run on a computer.

It is preferred that a computer readable medium carrying a computer program comprising program code means for performing the steps of the inventive method when said program product is run on a computer.

It is further preferred that an electronic control unit for controlling an engine brake operation of a vehicle, being configured to perform the steps of the inventive method.

Further developments of the invention are described in conjunction with the figures.

DETAILED DESCRIPTION

In the following two embodiments of the invention is shown and described, simply by way of illustration of two modes of carrying out the invention.

Figure 1:
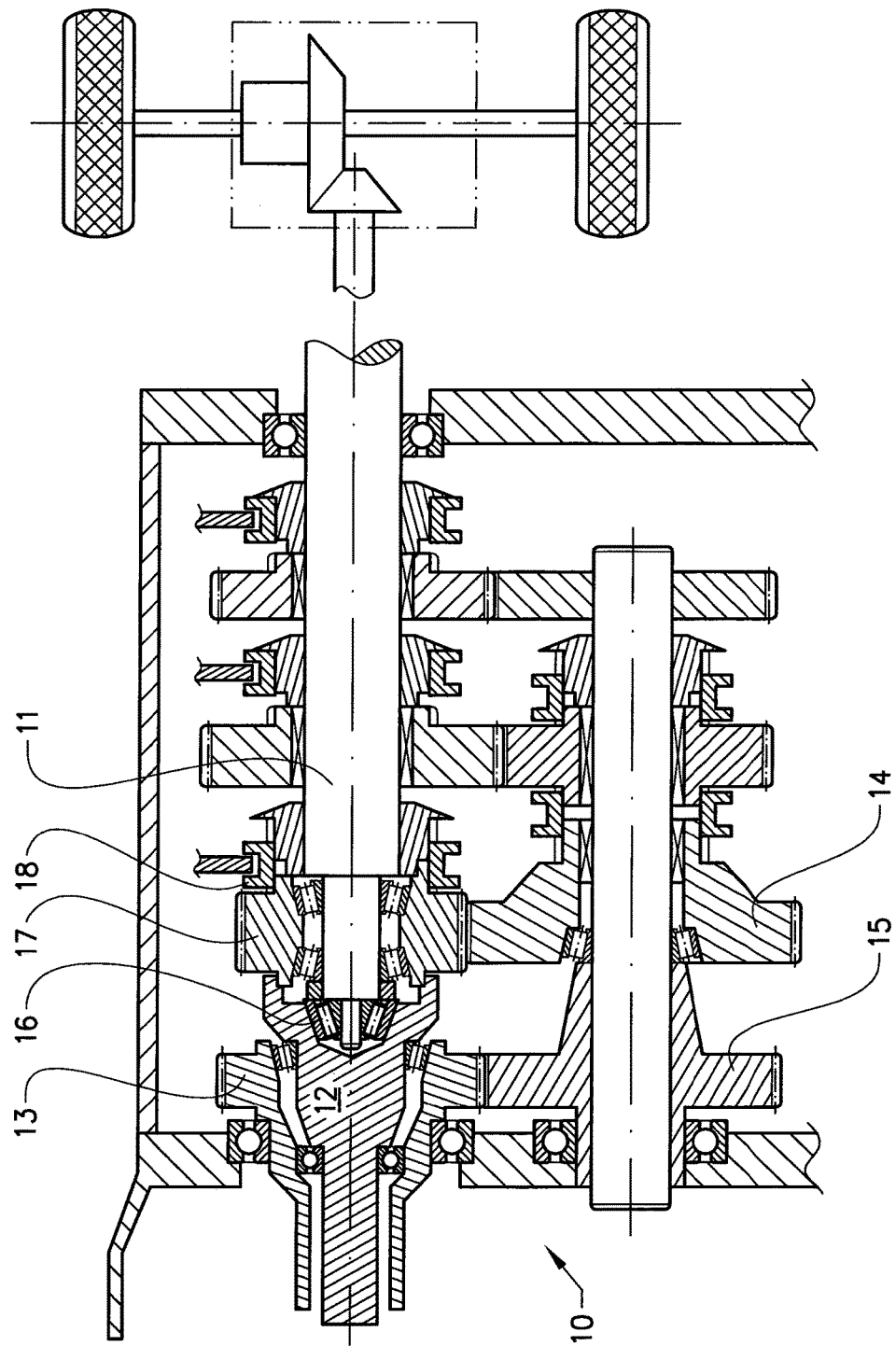
FIG. 1 shows a schematic drawing of a dual clutch transmission.

FIG. 1 shows a schematic drawing of a dual clutch transmission 10 for which it is beneficial to implement the inventive method. The dual clutch transmission 10 comprises a main shaft 11, a first and a second coaxial input shaft 12; 13, and a first and a second counter shaft 14; 15. The first input shaft 12 is arranged inside the second input shaft 13 and the main shaft 11 is suspended in said first input shaft 12 through a spigot bearing 16. Additionally, the first input shaft 12 is rotatably connected to a first gearwheel 17, which is rotatably arranged upon said main shaft 11. The second counter shaft 15 consists of or comprises gear wheels arranged on the first counter shaft 14, according to known manner. According to FIG. 1, a first engaging sleeve 18 is arranged in a position such that the engaging sleeve 18 is locking a rotation of the first gearwheel 17 to a synchronized rotation of the main shaft 11, which thereby is synchronised with the first input shaft 12, whereby there is no relative rotation between the first input shaft 12 and the main shaft 11. Hence, FIG. 1 shows a gear-combination for which the first input shaft 12 and the main shaft 11 have a synchronized rotation.

Each gear-combination comprises an active gear and a passive gear, wherein the active and the passive gear are allocated to the first and the second input shaft 12; 13. Which gear that is active and which gear that is passive is dependent on which of the first and the second input shaft 12; 13 that is engaged, which in turn is dependent on for which input shaft 12; 13 respective driving clutch (not shown) is engaged. During normal driving (i.e. not during gear shifting) only one of the first and the second driving clutches is engaged. However, during a power shifting both the driving clutch of the first and the second input shaft are in an at least partially engaged state.

If an engine braking, operation is initiated when the dual clutch transmission 10 is set in one of the pre-set number of gear-combinations, or if gear shifting to one of the pre-set number of gear-combinations is performed during engine braking, the large axial forces from the engine braking can cause extensive wear of the spigot bearing 16.

According to FIG. 1 the spigot bearing 16 is arranged between the first input shaft 12 and the main shaft 11. Hence, when there is no relative rotation between the first input shaft 12 and the main shaft 11, there will be no relative rotation within the spigot bearing 16 and the rollers of the spigot bearing 16 will be still. The large axial gear mesh forces acting on the stationary rollers of the spigot bearing 16 will squeeze away the oil from the bearing contact surfaces. When the axial gear mesh forces are applied on the spigot bearing 16 with inadequate or non existing oil film will cause wear of the spigot bearing 16. The inventive method decreases or prevents damaging load upon a spigot bearing 16 during engine braking situations where there is no relative rotation in the spigot bearing 16 by preventing that the dual clutch transmission is set in one of the pre-set number of gear-combinations during engine braking.

Figure 2A:
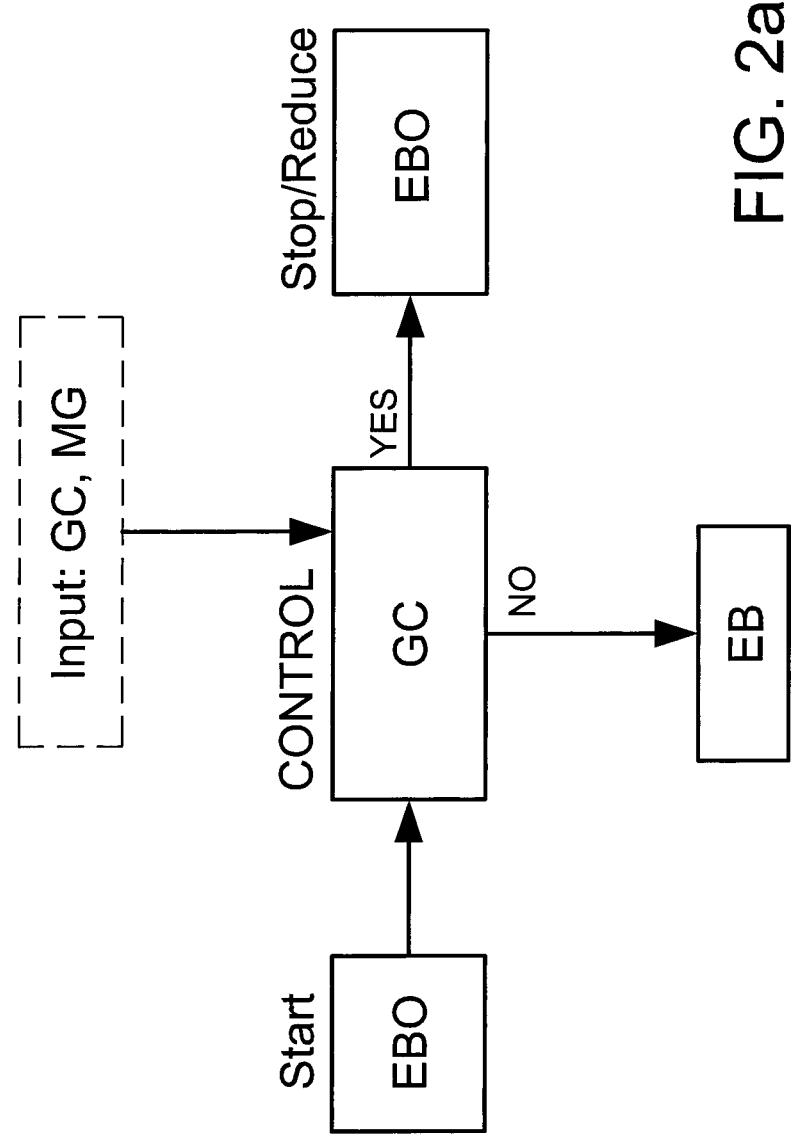
FIGS. 2a and 2b show flowcharts of two different variants of the inventive method.

Now referring to FIG. 2a, which shows a flowchart of an embodiment of the inventive method. The inventive method can be implemented in a separate electronic control unit of the vehicle or in another control unit of a vehicle such as a transmission control unit.

The inventive method is initiated by the start of an engine braking operation START EBO and/or by during an engine braking operation a gear shift is performed. The first step in the inventive method comprises a gear-combination control GC CONTROL. At the gear-combination control GC CONTROL an evaluation of whether the dual clutch transmission is set in one of the pre-set number of gear-combinations is performed. The pre-set number of gear-combinations is given as input GC to the gear-combination control GC CONTROL, together with the momentary gear MG input. The pre-set number of gear-combinations GC are the gear combinations where there is no relative rotation in the spigot bearing in either of the passive or the active gear.

If a momentary gear-combination MG is not one of the pre-set numbers of gear-combinations GC the inventive method to control an engine braking operation is terminated, and the engine braking operation proceeds as normal (box EB).

If the momentary gear-combination MG of the transmission is one of the pre-set number of gear-combinations said engine braking operation is modified in EBO such that a damaging load upon said spigot bearing is reduced or stopped. The engine braking operation can be modified in different ways as mentioned above in order to reduce or stop the damaging load.

The different ways can be one or several of; reduce engine braking torque, interrupt the engine braking operation, select a passive/active gear which allows a relative rotation between the first input shaft and the main shaft, and/or select a gear-combination that comprises an active gear reducing an axial load (F) upon the spigot bearing.

Figure 2B:
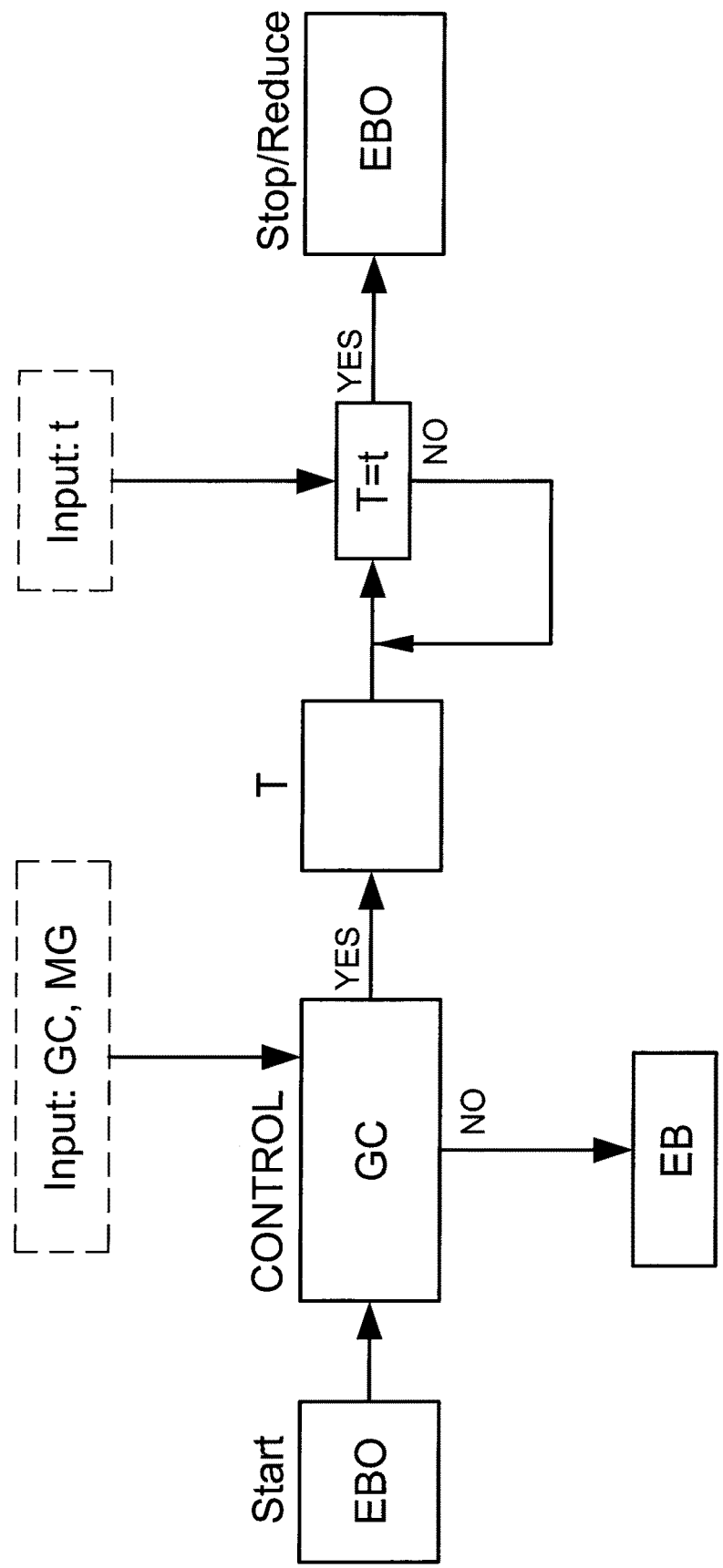

In a further embodiment disclosed in FIG. 2b the first steps up to GC are the same as in the embodiment of FIG. 2a, but here if the momentary gear-combination MG of the transmission is one of the pre-set number of gear-combinations GC a timer T is instead started. The timer T is timing the time the engine braking operation is ongoing while the transmission is set one of the pre-set gear-combinations GC. Continuously after starting the timer T an evaluation of whether the timer T has reached a predefined time limit t is performed, T=t. As input to the evaluation T=t, the time limit t is given. The time limit t can be a predefined time limit or a time limit dependent on a parameter such as axial load, bearing wear, time since last oil change, quality of the oil and oil temperature in the transmission etc.

As long as the timer T has not reached the time limit t the engine braking operation proceeds as normal. When the timer T reaches the time limit t the engine braking operation is reduced or stopped EBO. As mentioned above the engine braking operation can be modified in different ways in order to reduce or stop the damaging load.

According to preferred embodiments of the inventive method, the modification is performed in that the transmission is shifted such, that a gear-combination is selected, which:
comprises an active gear which reduces the axial load F upon the spigot bearing 16,
comprises an active gear, which allows a relative rotation between said first input shaft 12 and said main shaft 11,
comprises a passive gear which allows a relative rotation between said first input shaft 12 and said main shaft 11, or
that a synchronisation of the first input shaft and the main shaft, in a passive gear, is interrupted, i.e. no passive gear is selected.

The engine brake torque can be reduced in addition thereto, in order to reduce the axial load upon the spigot bearing.

It is preferred that the measure which has the least noticeable effect for the drive is chosen, i.e. a change in the passive gear set up. At least one of the measures has to be performed in order to modify the engine braking operation in the momentary gear-combination.

It is to be understood that the present invention is not limited to the embodiments described above and illustrated in the drawings; rather, the skilled person will recognize that many changes and modifications may be made within the scope of the appended claims.

The invention claimed is:

1. A method to control an engine braking operation of a vehicle provided with a dual clutch transmission, wherein the dual clutch transmission comprises a main shaft and a first and a second coaxial input shaft, wherein
the first input shaft is arranged inside the second input shaft,
the main shaft is suspended in the first input shaft through a spigot bearing,
the first input shaft is rotationally fixed to a first gearwheel, which is rotatably arranged upon the main shaft, and the transmission is adapted to be set into different gear combinations, each gear combination comprising an active gear selection through which torque can be transmitted, and a passive gear selection through which no torque can be transmitted, and wherein, in a pre-set number of gear combinations, the first input shaft and the main shaft have a synchronized rotation,
the method comprising
setting the vehicle in the engine braking operation and, while the vehicle is set in the engine braking operation:
continuously checking if the transmission is set in one of the pre-set number of gear combinations, and
in response to a determination that the transmission is set in one of the pre-set number of gear combinations, modifying the engine braking operation such that a damaging load upon the spigot bearing is reduced.

2. The method according to claim 1, wherein the modifying of the engine braking operation at least comprises a reduction of an engine braking torque.

3. The method according to claim 1 wherein the modifying of the engine braking operation at least comprises an interruption of the engine braking operation.

4. The method according to claim 1, wherein the modifying of the engine braking operation at least comprises an interruption of the engine braking operation in the one of the pre-set number of gear combinations.

5. The method according to claim 1, wherein the modifying of the engine braking operation at least comprises selecting a selected gear combination of the gear combinations that comprises a selected active gear of the active gear selection and that reduces an axial load upon the spigot bearing.

6. The method according to claim 1, wherein the modifying of the engine braking operation at least comprises selecting a selected gear combination of the gear combinations that comprises a selected active gear of the active gear selection and that allows a relative rotation between the first input shaft and the main shaft.

7. The method according to claim 1, wherein a timer is started upon determining that the transmission is set in one of the pre-set number of gear combinations, and when the timer has reached a predefined time limit performing the modifying of the engine braking operation.

8. The method according to claim 7, wherein the time limit is dependent on at least one of the following parameters: axial load, bearing wear, time since last oil change, oil temperature in the transmission.

9. The method according to claim 7, wherein the time limit is predefined from 0 to 60 seconds.

10. A computer comprising a computer program for performing the steps of claim 1 when the program is run on the computer.

11. A non-transitory computer readable medium carrying a computer program for performing the steps of claim 1 when the program product is run on a computer.

12. An electronic control unit for controlling an engine braking operation of a vehicle, the electronic control unit being configured to perform the steps of the method of claim 1.

* * * * *